Figure 1A:
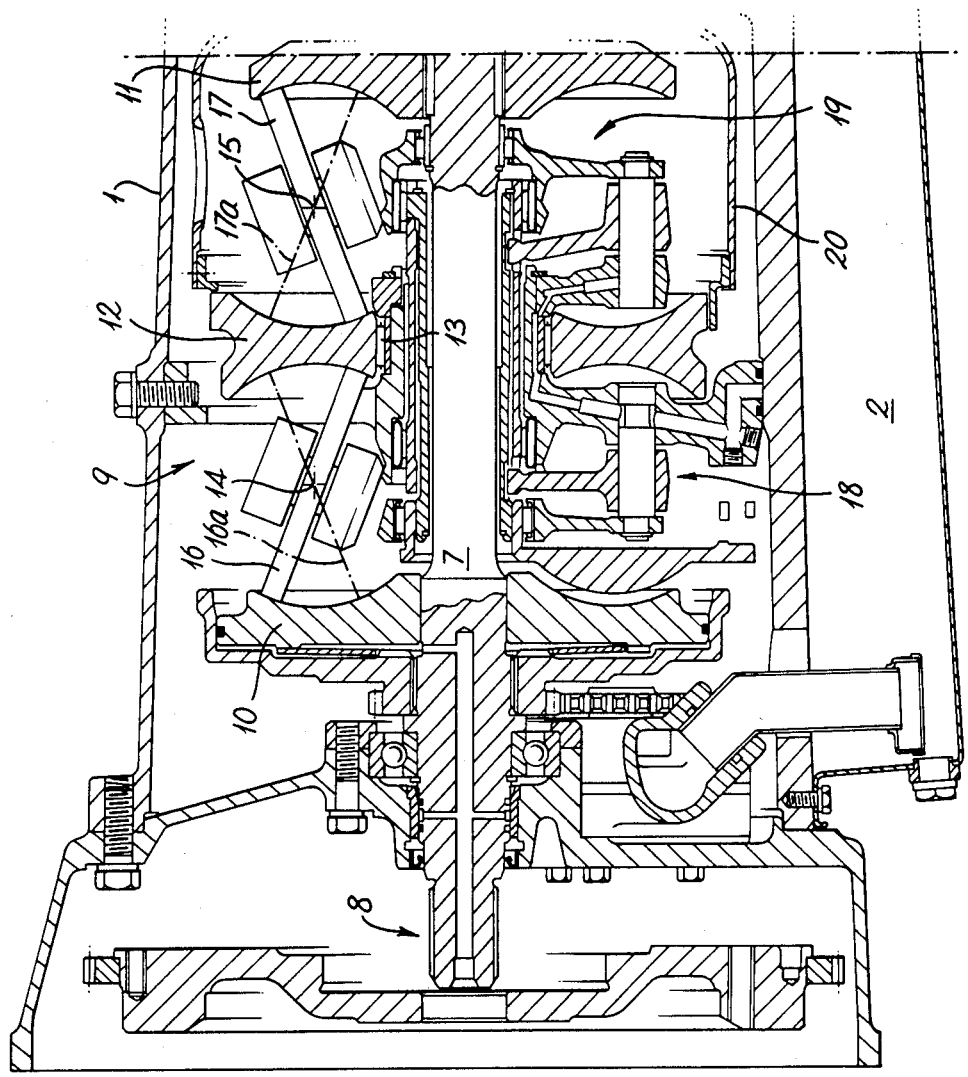

United States Patent [19]

de Brie Perry

[11] Patent Number: 4,628,766

[45] Date of Patent: Dec. 16, 1986

[54] CONTINUOUSLY-VARIABLE RATIO TRANSMISSION

[75] Inventor: Forbes G. de Brie Perry, Charlbury, England

[73] Assignee: National Research Development Corp., London, England

[21] Appl. No.: 672,898

[22] Filed: Nov. 19, 1984

[30] Foreign Application Priority Data

Nov. 17, 1983 [GB] United Kingdom ............... 8330683

[51] Int. Cl.[4] ...................... F16H 37/06; F16H 15/00
[52] U.S. Cl. ...................................... 74/691; 74/796; 74/190; 74/200
[58] Field of Search ................ 74/690, 691, 200, 201, 74/190, 796, 789, 190.5, 740

[56] References Cited

U.S. PATENT DOCUMENTS

| | | | |
|---|---|---|---|
| 1,817,159 | 8/1931 | Morison | 74/691 |
| 3,244,025 | 4/1966 | Francisco | 74/690 |
| 3,406,597 | 10/1968 | Perry et al. | 74/865 |
| 3,494,224 | 2/1970 | Fellows et al. | 74/691 |
| 3,545,302 | 12/1970 | Schofield | 74/691 |
| 4,272,999 | 6/1981 | Perry | 74/200 |
| 4,297,918 | 11/1981 | Perry | 74/690 |
| 4,499,782 | 2/1985 | Perry | 74/200 |

FOREIGN PATENT DOCUMENTS 0043184 1/1982 European Pat. Off. ............. 74/690
2108599 5/1983 United Kingdom ................. 74/691

Primary Examiner—Kenneth J. Dorner
Assistant Examiner—David Novais
Attorney, Agent, or Firm—Cushman, Darby & Cushman

[57] ABSTRACT

A continuously-variable-ratio automotive transmission, typically of the toroidal-race rolling traction type, in which mechanism comprising a clutch, a brake and two epicyclic combinations—a reversing train and a mixing train—is interposed between the ratio-varying unit and the output of the transmission as a whole. By operation of the clutch and the brake the elements within the mechanism may be arranged in two different combinations whereby the transmission may operate in first and second "regimes", one or other of which will offer efficient transmission throughout the entire operating range of the source of the automotive power. The invention lies in a particular choice of the two different combinations resulting in reasonable containment of gear speeds, no requirement for power to be transmitted through the intermeshing gears of an epicyclic when the transmission is in its second (high gear) regime, and no interference between the final member of the transmission and any grounding that any items within it—for instance the planet carriers of the epicyclics—may require. The latter feature facilitates the use of a simple solid gear, rather than an annular one, as the final transmission member.

4 Claims, 2 Drawing Figures

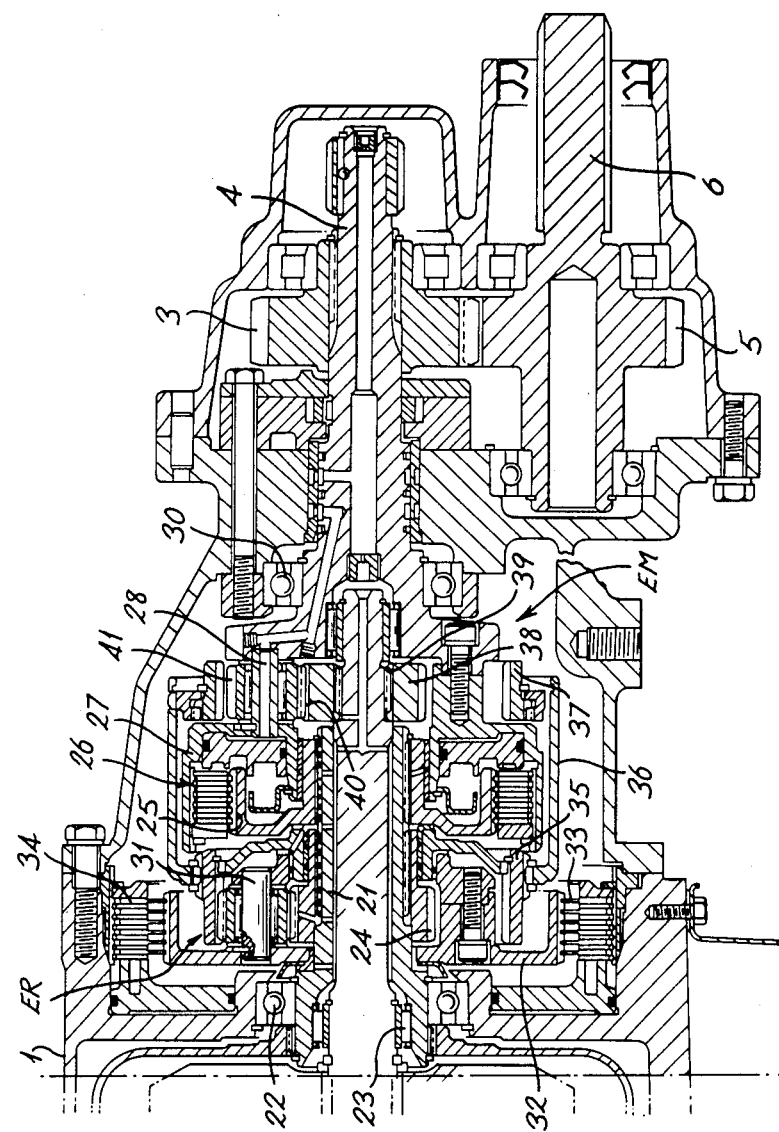

CONTINUOUSLY-VARIABLE RATIO TRANSMISSION

This invention relates to continuously-variable ratio transmission, of the kind suitable for instance to connect the prime mover of an automatic vehicle to the driven wheels. It relates especially to the known class of such continuously-variable transmissions the operation of which can be divided clearly into two distinct phases or "regimes", the operation of which and relationship between which will now be explained. Assume that the input to the transmission is being driven by the prime mover at constant speed and that the first regime is in operation, with the ratio-varying unit - "variator" - of the transmission set to one extreme position. Typically the output or final member of the transmission will now be rotating in its reverse direction, and at a maximum speed. If now the setting of the variator is progressively changed so as to approach the opposite or second extreme, typically the speed of the final member will progressively fall until a point is reached, before that second extreme is reached, at which the speed is zero, at which stage the setting of the transmission is commonly known as "geared idle". As the setting of the variator then continues to progress to the second extreme, the output begins to operate in the forward direction with increasing speed. If when the second extreme setting is reached the second regime is then connected in place of the first, and the setting of the variator is progressively moved back to the first extreme, the rotation of the final member remains in the forward sense and increases steadily to maximum forward speed.

The invention applies particularly to transmissions of the so-called toroidal race rolling traction type, of which UK Pat. No. 1078791 shows an example, in which the variator comprises at least one input disc which is rotated by the prime mover and which has a coaxial toroidal race formed on one face. The output of the variator includes a coaxial output disc formed with a similar and confronting toroidal race, the surfaces of the two confronting races together forming part of the surface of a single imaginary torus. Traction is transmitted from input to output discs across the torus by means of sets of rollers, each of which contacts both races and is mounted to rotate with its diameter substantially tangential to the torus centre circle, and with its axis of rotation intersecting the common axis of the two discs. By altering the setting of the rollers so that their diameter remains tangential to the torus centre circle but so that the axis of rotation of each roller moves to intersect the discs axis at a different point, the ratio between the speeds of the input and output discs, and thus the ratio transmitted by the transmission unit as a whole, is varied. In UK Pat. No. 1078791, as in other known transmissions of this kind, an adjustable mechanism including gears connects the final member of the transmission both to the variator output disc and, by means not including the variator, to the input from the prime mover also. The mechanism is capable of being arranged in two different ways corresponding respectively to the first and second regimes as already described, and the mechanism and its gearing are so designed that if their arrangement is changed when the rollers are at their second extreme setting, there is no instantaneous change in the speed of the output shaft: such a change is known in the art as a "synchronous change".

The present invention seeks to provide a two-regime continuously-variable ratio transmission in which the mechanism connecting the variator to the final member is novel and has the potential advantages at least of reasonable containment of gear speeds, no requirement for power to be transmitted through the intermeshing gears of any epicyclic when the transmission is in its second regime, and no axial interference between the final member of the transmission and any grounding that any of the gearing items within the transmission—for instance the planet carriers of epicyclics—may require. The absence of any interference as just mentioned facilitates the use of a simple solid gear as the final member of the transmission, rather than the annular gear that would be necessary if grounding structure had to pass axially through the middle of it.

According to the invention a continuously-variable ratio transmission capable of working in two regimes includes two parts. The first part comprises a variator having an input connectable to a prime mover, and an output. The input of the second part, which includes gearing, is connected to both the input and the output members of the first part, and the output of the second part is connected to the final member of the transmission. The gearing of the second part includes two epicyclic combinations which will be referred to as the reversing epicyclic (ER) and the mixing epicyclic (EM). The planet carrier of EM is connected to the final member and also, by way of a clutch, to the sun of ER and also to the output V of the variator. Input I of the variator is connected to the sun of EM, the annulae of EM and ER are mounted in common, and the planet carrier of ER is connected to a brake. The transmission is capable of operating so that in the first regime the clutch is disengaged and the brake engaged, and the motion of the final member reflects the motion of the planet carrier of EM in response to input I from the sun of EM, and input V transmitted from the sun of ER, through the braked planet carrier of that epicyclic to the annulus and so to the commonly-mounted annulus of EM. In the second regime the brake is disengaged and clutch engaged, and the final member moves at the speed of variator output V, to which it is connected by way of the planet carrier of EM and the clutch, and all the other gearing components of epicyclics EM and ER simply idle.

The variator may be of the toroidal race, rolling traction type, which may typically be of the known "double-ended" kind comprising two concentric and oppositely-facing input discs and a single concentric and double-faced output disc between them, in which a first set of rollers tranmits drive from the first input disc to one face of the output disc and a second set of rollers compatibly transmits drive between the second input disc and the opposite face of the single output disc. The output is then transmitted from the output disc to the input of the second part of the transmission by a bell-shaped member that passes over and encloses one of the input discs.

The planets of EM may be arranged in meshing pairs, one of each pair meshing also with the annulus and the other also with the sun, in order for the second part of the transmission to provide the direction-reversing facility needed to derive an appropriate output from its inputs V and I during the first regime.

Preferably the input and output discs of the variator, the two epicyclics EM and ER and the final member of the transmissions are all coaxial.

The invention is further defined by the claims and will now be described, by way of example, with reference to the accompanying drawing wherein FIG. 1A is the left hand side of an axial section through a transmission for an automobile vehicle and FIG. 1B is the right hand side.

The transmission is housed within a casing 1 which is anchored to the fixed structure of the vehicle (not shown) and which carries an oil sump 2. Gear 3, which rotates with shaft 4, is the final member of the transmission and meshes with a gear 5 to transmit the output of the transmission by way of shaft 6 to the final drive (not shown) of the vehicle, reference 7 indicates the input shaft of the transmission, and the left-hand end 8 of that shaft is adapted for connection to a prime mover (not shown). A variator 9 of the toroidal race rolling traction type constitutes the first part of the transmission and comprises single-faced input discs 10, 11 mounted on shaft 7 without freedom to rotate relative to it, and a single but double-faced output disc 12 mounted on bearings 13 so as to be capable of such rotation. The confronting toroidal faces of input disc 10 and one side of output disc 12 form part of the surface of a single imaginary torus having a centre circle 14, and the confronting toroidal faces of disc 11 and the other side of output disc 12 from parts of the surface of a second and similar imaginary torus having a centre circle 15. A set of rollers of which one (16) is shown transmit drive from disc 10 to disc 12, and a similar set of rollers of which one (17) is shown transmit drive at the same ratio from disc 11 to the other face of disc 12. Part of the mechanism both to mount the two sets of rollers 16 and 17, and to pivot them in unison about axes lying tangential to centre circles 14 and 15 so that they alter the ratio transmitted from discs 10 and 11 to output disc 12, is shown in outline at 18, 19 but will not be described in detail or completely since the construction and operation of such mechanism is no part of the present invention and is well known in the art.

A rotatable bell-shaped member 20 fits around input disc 11 and rollers 17 and connects output disc 12 to the second part of the transmission. Member 20 is connected to a rotatable sleeve 21 supported from the housing 1 by bearings 22 and from input shaft 7 by bearings 23. Sleeve 21 is splined both to the sun member 24 of a reversing epicyclic ER and to one half 25 of a clutch unit 26, the other half 27 of which is connected to one axial end of the planet carrier 28 of a mixing epicyclic EM. The opposite axial end of carrier 28 is attached to shaft 4 which is supported from the housing 1 by a bearing 30.

The planet carrier 31 of reversing epicyclic ER is mounted on a frame 32 which carries the movable elements 33 of a brake, the co-operating elements 34 of which are fixed to casing 1. The annulus 35 of epicyclic ER is linked by a sleeve 36 to the annulus 37 of epicyclic EM so that the two annulae 35 and 37 move in unison. The sun 38 of epicyclic EM is keyed to shaft 7 at 39.

The operating mechanisms of clutch 26 and brake 33/34 are well known in the art and not shown. When the transmission is working in its first regime clutch 26 is free, and brake elements 33, 34 are engaged. Planet carrier 31 is therefore prevented from rotation and a function of the velocity V of output disc 12 is transmitted to the annulus 37 of epicyclic EM by way of member 20, sleeve 21, the three components—sun 24, the planets and the annulus 35—of ER, and the sleeve 36. The velocity of input shaft 7 is communicated directly to epicyclic EM because sun 38 is keyed to that shaft and a resultant of the velocity of input shaft 7 and the function of the velocity of output disk 12 is transmitted to shaft 4 and so to final member 3 because shaft 4 is attached to the planet carrier 28 of EM. In order to achieve compatibility of sense of revolution between the velocity of input shaft 7 and the function of the velocity of output disk 12, the planets on carrier 28 are arranged in intermeshing pairs, one (40) of each pair meshing also with the sun 38 and the other (41) meshing also with the annulus 37.

In use, at one extreme of the first regime, the rollers 16, 17 will be in the positions in which they are shown in full lines and final member 3 will be rotating in its reverse sense and at the maximum reverse speed that is possible for a given value of the velocity of input shaft 7. As the setting of the rollers is now changed by mechanism 18, 19 causing each roller to pivot about the tangent to the centre circle (14, 15) on which it is located, the velocity of final member 3 progressively falls until a point is reached, before the rollers reach the opposite extremes of their pivotting travel indicated by broken lines 16a and 17a, when member 3 is stationary. As the rollers then continue to pivot to positions 16a and 17a, member 3 begins to move in the forward sense with increasing speed. Using criteria known in the art, the characteristics of epicyclics ER and EM and of their related parts may be so chosen that if at that point brake 33/34 is released and clutch 26 is simultaneously engaged, so that most of the gears of EM and ER now effectively idle and the drive is transmitted from member 20 to member 3 by way of sleeve 21, clutch 26, planet carrier 28 and shaft 4, there is no change in the overall ratio transmitted by the transmission and thus no intantaneous change to the speed of revolution of member 3: such a change, as has already been mentioned, is known in the art as a "synchronous change" into the second regime during which the reverse motion of the rollers back from positions 16a and 17a to 16 and 17 then results in a steady increase in the speed of forward revolution of member 3.

I claim:

1. A continuously-variable ratio transmission capable of operating in first and second operating regimes and including:

first and second parts;

said first part comprising a variator, including a ratio-varying unit;

said variator having an input connectable to a prime mover, and an output;

said second part including gearing and having an input and an output, said second part input being connected both to said first part input and to said first part output;

a final output member of said transmission;

said second part output being connected to said final output member;

said gearing of said second part including first and second epicyclic combinations, to be referred to as a reversing epicyclic (ER) and a mixing epicyclic (EM) respectively, ER and EM each respectively comprising a sun member, a planet carrier and an annulus;

a common axis along which are disposed in sequence said input to and said output of said variator, said reversing epicyclic and then said mixing epicyclic followed by said final output member of said transmission;

a clutch;

said planet carrier of EM being connected to said final output member and also, by way of said clutch, to said sun of ER and also to said variator output;

said variator input being directly connected to said sun of EM;

said annulae of EM and ER being mounted in common;

a brake, said planet carrier of ER being directly connected to said brake;

whereby said transmission is capable of operating so that in said first regime said clutch is disengaged and said brake engaged, and the motion of said final output member reflects the motion of said planet carrier of EM in response to inputs from both said sun of EM and said sun of ER, and in said second regime said brake is disengaged and said clutch engaged and said final output member moves at the speed of said variator output, being connectable to said variator output by way of said clutch and said planet carrier of EM.

2. A continuously-variable ratio transmission according to claim 1 in which said variator is of the toroidal race rolling traction type.

3. A continuously-variable ratio transmission according to claim 2 in which said variator comprises first and second concentric and oppositely-facing input discs and a single concentric output disc between said first and second input discs, said output disc having first and second oppositely-facing surfaces, in which a first set of rollers transmits drive from said first input disc to said first surface of said output disc and a second set of rollers compatibly transmits drive between said second input disc and said second surface of said output disc.

4. A continuously-variable ratio transmission according to claim 1 in which said planets of said planet carrier of EM are arranged in meshing pairs, one of each said pair meshing also with said annulus of EM and other of said pair also with said sun of EM.

* * * * *